United States Patent [19]

Iwata et al.

[11] 4,261,313

[45] Apr. 14, 1981

[54] METHOD OF AND APPARATUS FOR CONTROLLING IGNITION TIMING OF AN INTERNAL-COMBUSTION ENGINE

[75] Inventors: Toshiharu Iwata, Aichi; Tadashi Hattori; Siniti Mukainakano, both of Okazaki; Kenji Goto; Daisaku Sawada, both of Susono, all of Japan

[73] Assignees: Nippon Soken, Inc., Nishio; Toyota Jidosha Kogyo Kabushiki Kaisha, Toyota, both of Japan

[21] Appl. No.: 47,242

[22] Filed: Jun. 11, 1979

[30] Foreign Application Priority Data

Jun. 13, 1978 [JP]  Japan ................................. 53-71247

[51] Int. Cl.³ ............................................... F02P 5/14
[52] U.S. Cl. ...................................... 123/425; 123/416
[58] Field of Search ....... 123/117 D, 117 R, 146.5 A, 123/148 E, 119 ED

[56] References Cited

U.S. PATENT DOCUMENTS

| 3,871,342 | 3/1975 | Fujinami et al. ............. 123/146.5 A |
| 4,002,155 | 1/1977 | Harned et al. ................... 123/148 E |
| 4,061,116 | 12/1977 | Saida et al. ...................... 123/117 R |
| 4,120,272 | 10/1978 | Douaud et al. .................. 123/148 E |
| 4,153,020 | 5/1979 | King et al. ....................... 123/148 E |
| 4,162,666 | 7/1979 | Maioglio .......................... 123/117 D |

*Primary Examiner*—Charles J. Myhre
*Assistant Examiner*—Andrew M. Dolinar
*Attorney, Agent, or Firm*—Cushman, Darby & Cushman

[57] ABSTRACT

A method of and apparatus for controlling ignition timing of an internal-combustion engine in accordance with the degree of knocking, the apparatus comprising a knock detector for detecting a vibration corresponding to knocking of the internal-combustion engine, a knock detector circuit responsive to output from the knock detector for detecting the knocking of the internal-combustion engine, and corrective advance computing circuit responsive to an output signal from the knock detector circuit for controlling ignition timing of the engine, wherein the corrective advance computing circuit counts the number of knocks detected during a period of predetermined combustion cycles, compares the number of knocks with a predetermined number, and controls ignition to advance or delay it in accordance with the result of comparison.

6 Claims, 9 Drawing Figures

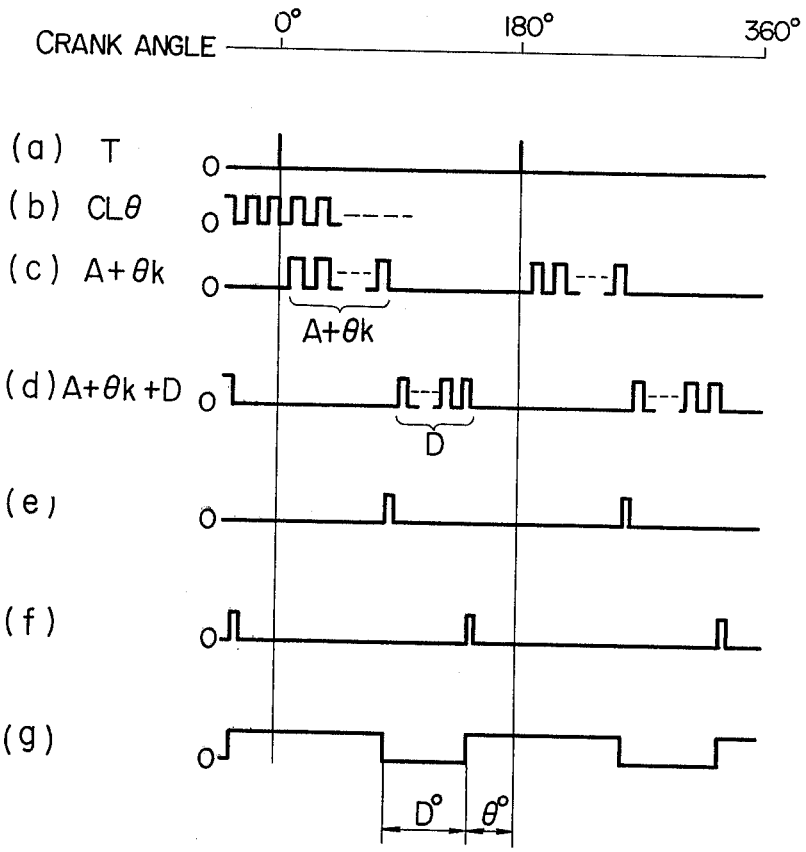
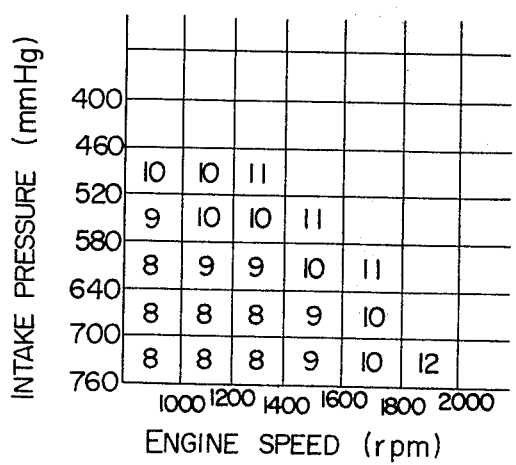
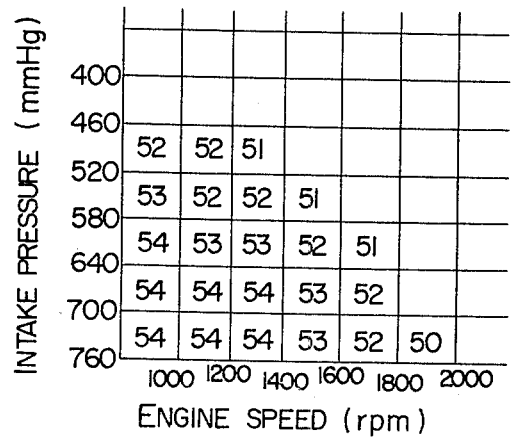

METHOD OF AND APPARATUS FOR CONTROLLING IGNITION TIMING OF AN INTERNAL-COMBUSTION ENGINE

BACKGROUND OF THE INVENTION

This invention relates to a method of and an apparatus for controlling ignition timing of an internal-combustion engine, wherein the ignition is controlled to a predetermined degree of knocking by detecting a knock through the vibration or sound which is produced within and outside cylinders by the pressure in the cylinders of the internal-combustion engine.

Ignition timing of an internal-combustion engine has to be determined in accordance with the condition of the engine so that it can be operated in an optimum condition. In the conventional ignition timing control device, the ignition is normally determined in accordance with the engine condition represented by the engine speed and negative intake pressure which are detected by a centrifugal advancing mechanism and a vacuum advancing mechanism, respectively.

Taking into consideration the efficiency and fuel comsumption of a system, it is generally known that ignition is effected most effectively in the vicinity of MBT (Minimum advance for Best Torque). To this end, ignition time should be varied according to the engine condition in a manner that it is effected at MBT.

In a particular condition, however, a knock occurs as ignition time is advanced, preventing the engine from operating stably. In a low speed and low load situation, a knocking limit comes generally before MBT in the relation between MBT and the ignition causing a knock. The knocking limit is also affected by the ambient conditions such as temperatures and humidity. In order to prevent knocking under all operating conditions, commonly used ignition control devices are programmed by using parameters of the engine speed and negative intake pressure in a manner that ignition is effected substantially later than MBT. This has prevented the output and fuel consumption of the engine from being improved.

As well known, ignition is strongly correlated with the pressure within cylinders. When fuel/air mixture is ignited, the pressure within the cylinders does not carry harmonic components (normally 5 KHz to 10 KHz) if no knock occurs, but is affected by harmonic components if a knock occurs.

The effect of harmonic components is delivered to the outside of the cylinders in the form of vibration or sound. Various studies on so-called knocking feedback ignition systems have been made in which ignition is controlled by detecting this vibration or sound.

In such conventional ignition systems, knock detecting is performed during each combustion for every cylinder, and the detected signal is utilized, for example, to produce a certain lag if a knock exists and to produce a certain advance if no knock exists. Thus, ignition timing control is performed based on each combustion phenomenon.

In case of a multi-cylinder engine, great variations of combustion exist between the cylinders, because there are variations in fuel distribution and mixture distribution in the intake system and because individual conditions (deposit, compression ratio, etc.) in the combustion chambers are different. Therefore, if feedback control is performed by such an ignition system as described above, the hunting of ignition time becomes large and this disadvantageously causes surging and slackening.

SUMMARY OF THE INVENTION

It is therefore an object of the invention to provide a method of and an apparatus for controlling ignition for an internal combustion engine, wherein the engine strokes are sampled more than tens of times and feedback control is performed so as to limit the number of knocks to several percent of the samples, so that optimum ignition can be obtained regardless of variations in fuel, engine performance and aging, and surging and slackening can be eliminated.

It is another object of the invention to provide a method of and an apparatus for controlling ignition for an internal combustion engine, wherein generation of a trace knock which is a relatively light knock is limited to several percent, and if a predetermine rate of knocking cycles are detected of predetermined samples, a lag is produced even if predetermined samples are not reached, so as to avoid heavy and light knocks due to the lag.

The present invention brings forth advantages as described below. Ignition can be set at an optimum point for the engine so as to improve the output and fuel consumption of the engine, since ignition is controlled to maintain a trace knock in which the knocking rate detected by a knock detector circuit is maintained within several percent. A performance change, changes in operating conditions such as a change of fuel constituent, variations or deviations in manufacture of engines, etc. can be absorbed. Surging and slackening can be eliminated because from several tens to tens of thousands of times of sampling are performed for feedback. If a knock occurs at more than a predetermined rate, a lag is promptly produced to avoid an excessive lag or delay so as to prevent damage to the engine and unpleasant knocking sound.

BRIEF DESCRIPTION OF THE DRAWINGS

FIG. 2 shows a time chart for illustrating the operation of the device shown in FIG. 1.

FIG. 3 shows an ignition program for the device shown in FIG. 1.

FIG. 4 shows a lag program corresponding to the program shown in FIG. 3.

DESCRIPTION OF THE PREFERRED EMBODIMENTS

Figure 1:
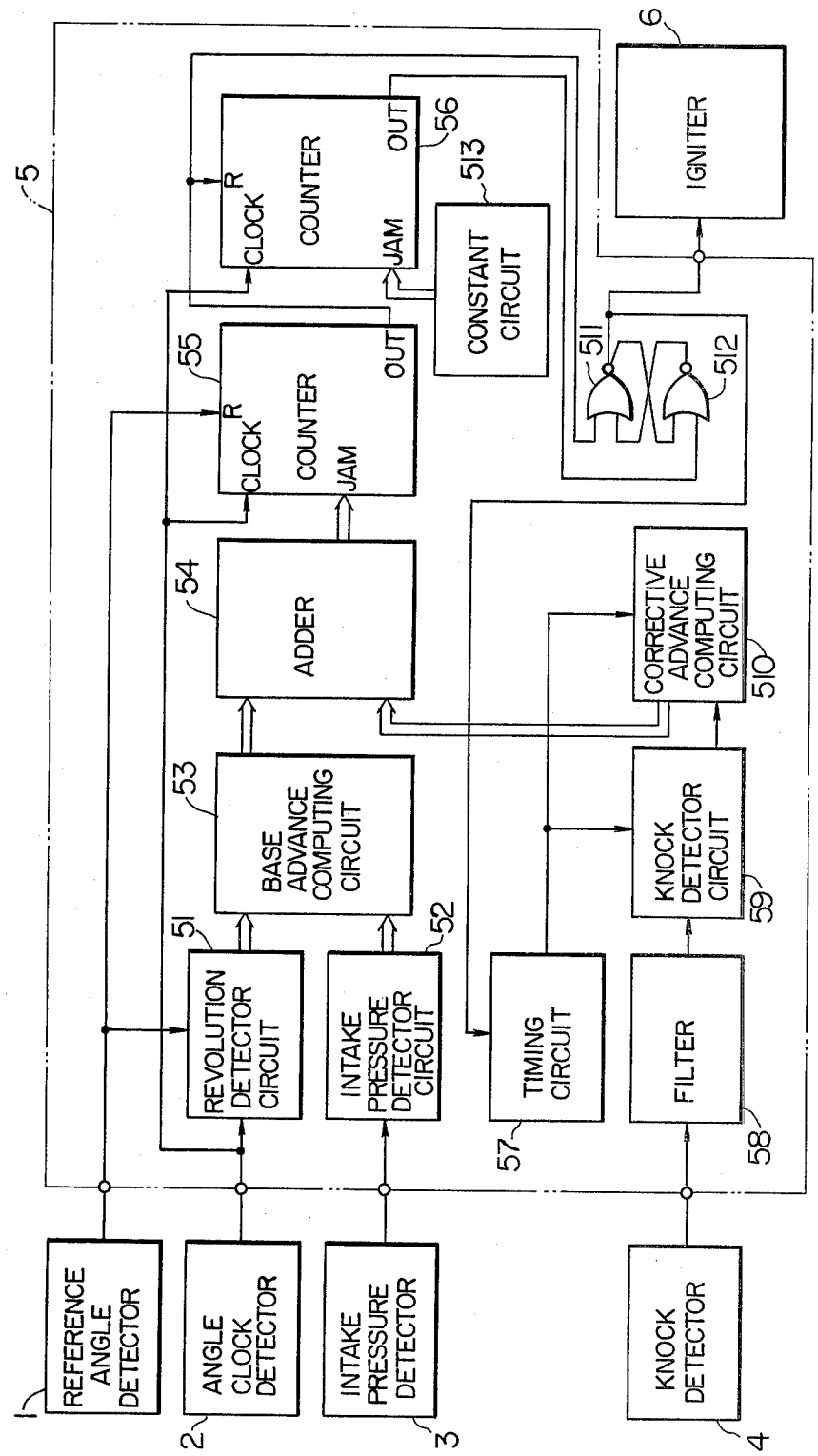
FIG. 1 shows a block diagram of a device according to one embodiment of the present invention.

The present invention will now be described by way of the preferred embodiment illustrated in the accompanying drawings. Referring to FIG. 1 illustrating a block diagram of the embodiment of the invention, there are provided a reference angle detector 1 for producing a reference angle signal T (twice per revolution at regular intervals in case of a four-cylinder, four-cycle internal-combustion engine) with respect to a crankshaft, an angle clock detector 2 for detecting the angle position of the crank, for example, at every 1° CA, and an intake pressure detector 3 for detecting the pressure at an intake manifold of an internal-combustion engine.

There is also provided a knock detector 4 for detecting vibrations of the engine or sounds, which are caused by knocking of the engine, in a piezo-electric manner (by piezo-electric elements) or an inductive manner (by magnets and coils). An ignition advance computing circuit 5 is connected to the reference angle detector 1, the angle clock detector 2, the intake pressure detector 3 and the knock detector 4, and is arranged to determine an ignition point in accordance with the operating condition of the engine. An ignitor 6 is also provided for energizing and deenergizing an ignition coil by amplifying the output signal current from the ignition advance computing circuit 5.

The ignition advance computing circuit 5 comprises a revolution detector circuit 51 for detecting the rotating speed or number of revolutions of the engine by utilizing the signal generated by the reference angle detector 1; an intake pressure detector circuit 52 for detecting the intake pressure in the engine by utilizing a signal generated by the intake pressure detector 3; a base advance computing circuit 53 including a read-only memory (called ROM hereinafter) to receive a revolution signal N from the revolution detector circuit 51 and an intake pressure signal P from the intake pressure detector circuit 52 so as to program a lag with respect to a reference position as an advance; a filter 58 such as a bandpass filter or high-pass filter for selectively extracting knocking frequency components from the output from the knock detector 4; a knock detector circuit 59 for determining the presence of a knock by way of the output from the knock detector 4 received through the filter 58; a corrective advance computing circuit 510 for computing an advance correction value based on a signal from the knock detector circuit 59 indicating the presence of a knock; a timing circuit 57 for generating timing signals for the knock detector circuit 59 and the corrective advance computing circuit 510; an adder 54 for adding a programmed value from the base advance computing circuit 53 to a corrective value from the corrective advance computing circuit 510; counters 55 and 56 having a JAM input; a constant determining or setting circuit 513 for determining current supply angle (D) of the ignition coil; and NOR gates 511 and 512 constituting a flip-flop.

Now, the operation of the apparatus according to the present invention, except for the timing circuit 57, the filter 58 and the knock detector circuit 59, will be described with reference to the time chart shown in FIG. 2. The reference angle detector 1 generates a reference signal T, as shown in FIG. 2(a), at each dead point of cylinders (i.e. twice each revolution of the crankshaft). The angle clock detector 2 generates an angle signal $CL\theta$, as shown in FIG. 2(b), every 1 degree of crankshaft rotation. Through the revolution signal N from the revolution detector circuit 51 and the intake pressure signal P from the intake pressure detector circuit 52, the ROM in the base advance computing circuit 53 has stored an advance value as a lag with respect to a reference position.

FIG. 3 shows a reference advance value $\theta$ divided along the engine speed N and intake pressure P. The values of FIG. 4, which have been stored in the ROM as a lag or delay angle A, is given by the expression $$A = 180 - \theta - \theta_{kO} - D = 62 - \theta$$

where 180 is the reference angular position, $\theta$ is the reference advance, $\theta_{kO}$ is the reference quantity of corrective advance from the corrective advance computing circuit 510 (assumed to be $\theta_{kO}=10°$) and D is a dwell angle (e.g. 180°). Assuming here that the intake pressure is 760 to 700 mmHg, an engine speed N of 1,200 to 1,400 rpm corresponds to A=54° because of $\theta=8°$ BTDC, N of 1,400 to 1,600 rpm corresponds to A=53° because of $\theta=9°$ BTDC, and N of 1,600 to 1,800 corresponds to A=52° because of $\theta=10°$ BTDC. If the intake pressure is 580 to 520 mmHg, an engine speed N of 1,200 to 1,400 rpm corresponds to A=52° because of $\theta=10°$ BTDC, and N of 1,400 to 1,600 rpm corresponds to A=51° because of $\theta=11°$ BTDC. The program described above is stored in the ROM.

If the program value is divided more finely, higher accuracy will be obtained but a larger capacity of ROM will be required. In such a case, the capacity of ROM can be reduced by using an interpolation between program points. In the above-described example, A=54° at N=1200 rpm and A=50° at N=1800. Thus, a mathematical interpolation shown below may be used.

$$A = \frac{50 - 54}{1800 - 1200} \times \Delta N + 54$$

where $\Delta N$=the detected number of revolutions Nx−1200.

The lag angle A from the base advance computing circuit 53 and the corrective advance signal $\theta_k$ from the corrective advance computing circuit 510 are added together in the adder 54, and the sum $(A+\theta_k)$ is supplied to the JAM input of the counter 55. The counter 55 is reset by the reference angle signal T and counts the angle signal $CL\theta$ as shown in FIG. 2(c). When $(A+\theta_k)$ counts are reached, the counter 55 produces a "1" output as shown in FIG. 2(e), and the "1" output is supplied to the NOR gate 511 in the flip-flop and also to another counter 56 to reset it. After reset by the output from the counter 55, the counter 56 continues to count until its count reaches D which is the number determined by the parameter determining circuit 513. The counter 56 then produces a "1" output as shown in FIG. 2(f), and the "1" output is supplied to the NOR gate 512 in the flip-flop. As a result, the NOR gate 511 produces output as shown in FIG. 2(g), and the output is coupled to the igniter. An ignition is made at the time the counter 56 produces the "1" output. When the output from the counter 55 becomes "1", current starts to flow and the dwell angle becomes the predetermined value D°.

Figure 5:
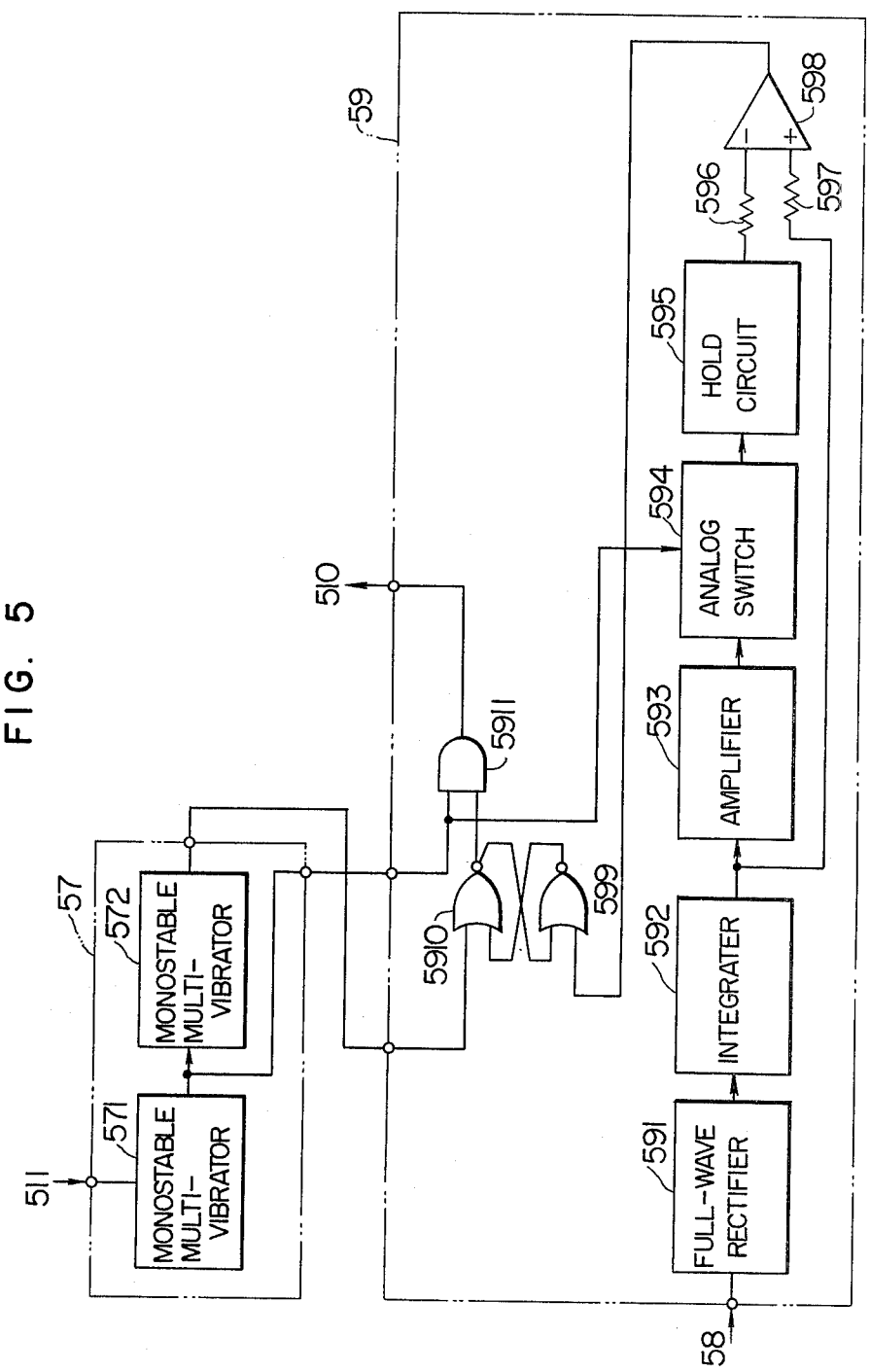
FIG. 5 shows a block diagram illustrating a timing circuit and a knock detector circuit for the device shown in FIG. 1.

Knock detection is performed by means of the timing circuit 57, the filter 58 and the knock detecting circuit 59. As shown in FIG. 5, the timing circuit 57 comprises monostable multivibrators 571 and 572 and receives the output from the NOR gate 511 which is also connected to the igniter. The monostable multivibrator 571 generates a pulse signal which rises at each ignition discharge and has a pluse width of $\tau 1$ as shown in FIG. 7(a). The monostable multivibrator 572 generates a pulse signal which rises at the end of the pulse width $\tau 1$ and has a pulse width of $\tau 2$. These output signals from the monostable multivibrators are coupled to the knock detector circuit 59. In addition these timing signals, the knock detector circuit 59 receives a vibration signal from the knock detector 4 through the filter 58 which limits the vibration signal to a predetermined bandwidth (5 to 10 KHz in this embodiment).

As shown in FIG. 5, the knock detector circuit 59 comprises a full-wave rectifier circuit 591, an integrator circuit 592, an amplifier 593, an analog switch 594, a hold circuit 595 including resistors and capacitors, input resistors 596 and 597, a comparator circuit 598, NOR gates 599 and 5910, and AND gate 5911.

The vibration signal is rectified by the full-wave rectifier circuit 591 and is then smoothed by the integrator circuit 592 in which a resistor and a capacitor are connected in parallel. The output from the integrator circuit 592 represents an average value of the vibration signal and it is coupled to the amplifier 593 and the resistor 597. The amplifier 593 amplifies the signal by factor of K and supplies its output to the hold circuit 595 through the analog switch 594 which is turned on after a period of $\tau 1$. The hold circuit 595 provides an output representative of the average value of a vibration signal for a period of $\tau 1$ subsequent to each ignition. The output from the hold circuit is supplied through the resistor 596 to one input of the comparator circuit 598 which has another input connected to the resistor 597 to directly receive the output from the integrator circuit 592. It should be noted that the vibration signal stored during a period of $\tau 1$ represents the averagea value of a base vibration including a noise signal and the average value multiplied by K is compared in magnitude with the direct signal value.

Knocking will not occur immediately after each ignition until a flame is produced. If a period of time $\tau 1$ from an ignition to the production of a flame is determined (normally within 1 msec.), a vibration of the base can be picked out during the period of time. Then, combustion develops, and when a knock appears, a greater vibration must result from the knock. The resultant vibration is compared with the base vibration so as to determine whether it is due to a knock. In general, the base vibration increases with the number of revolutions of the engine and also depends on the intake pressure. Therefore, this system may be used to check a variety of condition of the engine.

When knocking has occurred, the direct input to the comparator circuit 598 exceeds K times the base vibration signal, and the comparator circuit 598 provides a "1" output which is supplied to one input of the flip-flop consisting of NOR gates 599 and 5910, thereby inverting the output of the NOR gate 5910 to "1". The output from the NOR gate 5910 is supplied to the AND gate 5911 and gated by a pulse of $\tau 1$ duration, so that a pulse of $\tau 1$ duration appears at the output of the AND gate.

Figure 6:
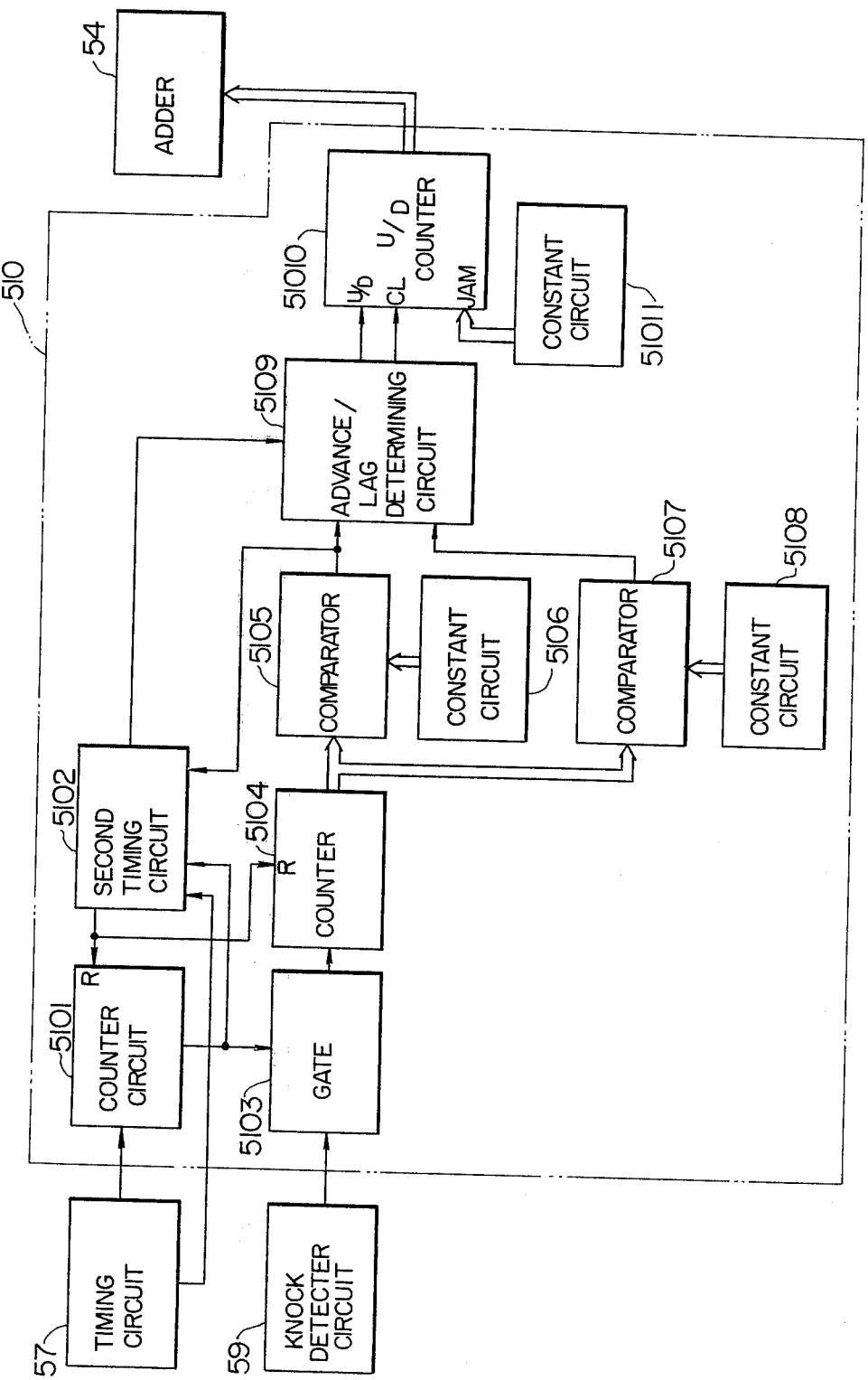
FIG. 6 shows a block diagram of a corrective advance computing circuit for the device shown in FIG. 1.

The operation of the corrective advance computing circuit 510 will now be described with reference to FIG. 6. The corrective advance computing circuit 510 comprises a (M+1) ring counter circuit 5101 for counting pulses of $\tau 1$ from the timing circuit 57 and producing a "1" output when it has reached predetermined (m+1)counts; a second timing circuit 5102 which receives the output from the counter circuit 5101, pulses of $\tau 2$ from the timing circuit 57 and the output from a comparator circuit 5105 and supplies a timing signal to an advance/lag determining circuit 5109, and a reset signal to the counter circuit 5101 and a counter 5104; a gate 5103 for passing therethrough the output from the knock detector circuit 59 only while the output from the counter circuit 5101 is "0"; a counter 5104 for counting the knock signal passed through the gate 5103 and producing a count output (n); a comparator 5105 for comparing the output (n) from the counter 5104 with the set number (a) determined by a constant setting circuit 5106 so as to produce a "1" output if $n \geq a$ and a "0" output if $n < a$; a comparator 5107 for comparing the output (n) from the counter 5104 with the parameter (b) determined by a constant setting circuit 5108 so as to produce a "1" output if $n \geq b$ and a "0" output if $n < b$ (where $a \geq b$); an advance/lag determining circuit 5109 which receives the timing signal from the second timing circuit 5102, the output signal from the comparator 5105 and the output signal from the comparator 5107 and provides an up/down signal (U/D) and a clock signal (CL); and an up/down (U/D) counter 51010 which receives the up/down signal (U/D) and the clock signal (CL) from the advance/lag determining circuit 5109, and the set number (c) determined by a constant setting circuit 51011, and counts up or down the clock signal (CL) from the set number (c) so as to provide the actual counts.

Figure 7:
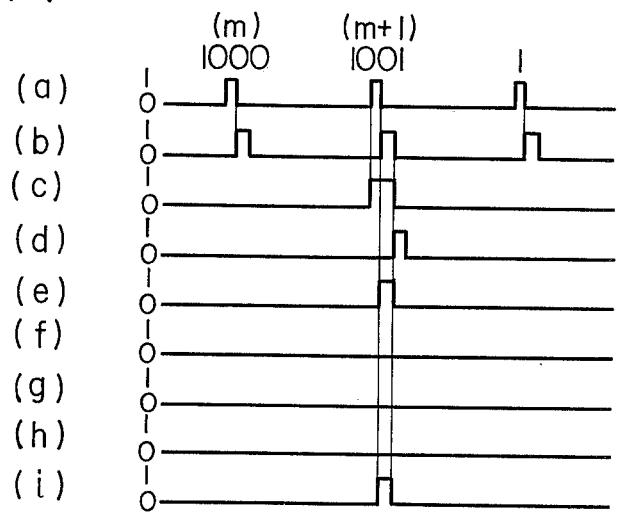
FIGS. 7, 8 and 9 show time charts for illustrating the operation of the circuit shown in FIG. 6.
Figure 8:
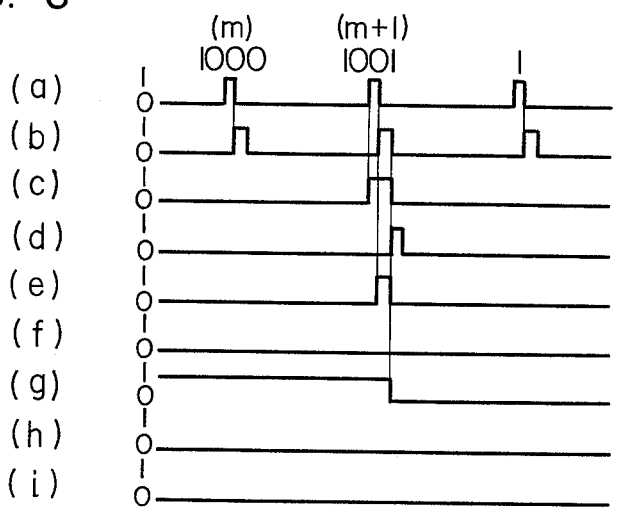
Figure 9:
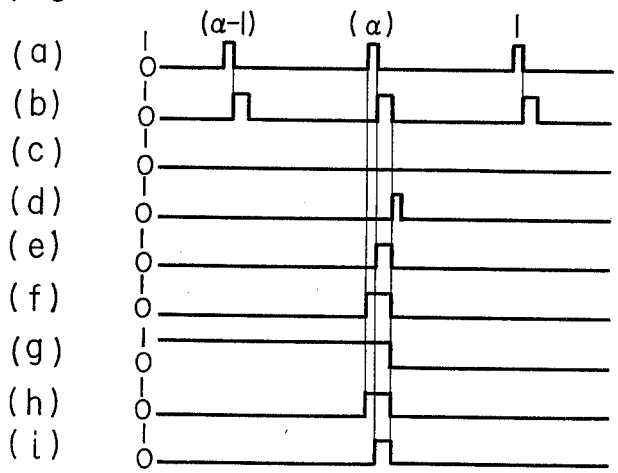

The operation of the corrective advance computing circuit will now be described with reference to FIGS. 7 to 9. The counter circuit 5101 determines a certain number of samplings (m) which may be from several tens to tens of throusands or more. For the sake of illustration, it is herein assumed that the number of samplings (m) is 1,000. The counter circuit 5101 whose set number is preset to be 1,001 counts pulses of $\tau 1$ as shown in FIGS. 7(a), 8(a) and 9(a), and the output from this counter circuit rises to "1" at the leading edge of the 1,001st pulse as shown in FIGS. 7(c) and 8(c). Then, the gate 5103 is turned off, and the knock signal accumulated in the counter 5104 represents the number of knocks (n) detected during '1,000 times of sampling.

If the number (n) agrees with $n < b \leq a$, the comparators 5105 and 5107 produce "0" outputs as shown in FIGS. 7(f) and 7(g), respectively, and the advance/lag determining circuit 5109 produces a "0" down signal as shown in FIG. 7(h) and a clock signal as shown in FIG. 7(i) which is the timing signal received from the second timing circuit 5102 synchronized with the 1,000st $\tau 2$ pulse as shown in FIG. 7(e). The U/D counter 51010 receives the DOWN signal and the clock signal and reduces its count by one to supply it to the adder 54 as a corrective angle $\theta k$. This reduces one from the JAM input of the counter 55, and therefore the counter finishes one count in advance to produce a 1° CA advance.

If the number of knocks (n) agrees with $a > n \geq b$, the comparator 5105 produces a "0" output as shown in FIG. 8(f), while the comparator 5107 produces a "1" output as shown in FIG. 8(g). The advance/lag determining circuit 5109 produces a "0" DOWN signal as shown in FIG. 8(h) and a "0" clock signal as shown in FIG. 8(i). Therefore, the U/D counter 51010 does not change its count and supplies it to the adder 54 so that the advance angle is not changed.

If the number of knocks (n) agrees with $n = a$ within 1,000 times of sampling, e.g. in the $\alpha$th sampling, then the comparator 5105 is responsive to the leading edge of the $\alpha$th $\tau 1$ pulse to produce a "1" output as shown in FIG. 9(f). Because of $n = a \geq b$ in this instance, the output from the comparator 5107 is at "1" as shown in FIG. 9(g). Thus, the advance/lag determining circuit 5109 produces a "1" UP signal as shown in FIG. 9(h) and a clock signal as shown in FIG. 9(i) which is the timing signal of FIG. 9(e) received from the second timing circuit 5102 synchronized with the $\alpha$th pulse shown in FIG. 9(b). As a result, the U/D counter 51010 increases its count by one. This adds one to the JAM input of the counter 55, and the counter counts one additional count to produce a 1° CA lag. The reset signal from the second timing as shown in FIGS. 7(d), 8(d) and 9(d), the reset signal from the second timing circuit is a short pulse which rises at the trailing edge of the 1,001st or $a$th $\tau$1 pulse. The reset pulse resets the counter circuit 5101 and the counter 5104 so as to resume sampling.

If a first 1,000 samples resulted in $n < b \leq a$, thereby producing a 1° CA advance, and if another 1,000 samples also resulted in $n < b \leq a$, then the U/D counter 51010 has counted two less than its original count to produce a 2° CA advance. In such a manner, the count in the U/D counter 51010 is increased or decreased so that the amount of advance can be controlled in a manner that a predetermined number of knocks (n) agrees with $a < n \leq b$.

Preferably, the parameters (a) and (b) are several percent of the number of samples. If $a=50$ and $b=20$ in case of 1,000 samples, continuous feedback control can be effected against the trace knocking in which a knock occurs within an average range of 2 to 5%.

In the above-described embodiment, the knock detector 4 has been described as means for detecting the vibrations of the internal combustion engine. However, a microphone may be used to detect a knock. In this invention, as the vibration sensor any of various types of sensors such as a vibration sensor of acceleration, velocity, or displacement type may be used.

We claim:

1. A method of controlling ignition timing in an ignition control apparatus for an internal combustion engine having a knock detector for detecting a vibration factor corresponding to knocking of said internal combustion engine; a knock detector circuit responsive to an output from said knock detector for detecting knocking of said internal combustion engine; and a corrective advance computing circuit responsive to an output from said knock detector circuit for controllably influencing ignition timing in accordance with an indicated one of a plurality of functions, said functions including advancing, maintaining, and delaying ignition timing, said method comprising the steps of:

detecting a knock rate as a function of sampling engine knock during engine combustion cycles in said corrective advance computing circuit, said corrective advance computing circuit counting up to a predetermined number of combustion cycles and counting detected knocks during the counting of said combustion cycles;

advancing ignition timing by a predetermined angle at the end of a predetermined number of samples when said knock rate is less than a predetermined low rate, said ignition timing being advanced when the number of detected knocks is smaller than the smaller of two predetermined numbers at the completion of counting of said predetermined number of combustion cycles;

maintaining ignition timing at the end of said predetermined number of samples when said knock rate is within a predetermined range, said ignition timing being maintained when the number of detected knocks is between the smaller and larger of said two predetermined numbers at the completion of counting of said predetermined number of combustion cycles;

delaying ignition timing by a predetermined angle when said knock rate is greater than a predetermined high rate, said ignition timing being delayed when the number of detected knocks exceeds the larger of said two predetermined numbers at any time prior to and including the completion of counting of said predetermined number of combustion cycles; and resetting the counting of combustion cycles and detected knocks for restart at the earlier of two conditions, said conditions being the number of combustion cycles equalling said predetermined number of combustion cycles and the number of detected knocks exceeding the larger of said two predetermined numbers.

2. An ignition timing control apparatus for an internal combustion engine comprising:

a knock detector for detecting a vibration factor corresponding to knocking of said internal combustion engine;

a pulse generator for generating a pulse signal synchronized with each ignition of the engine;

a knock detector circuit for detecting a signal indicative of knocking contained in an output from said knock detector, and for generating a pulse signal indicative of knocking in accordance with an output signal from said pulse generator; and a corrective advance computing circuit including;

a first counter for counting pulses supplied from said pulse generator;

a second counter for counting said pulse signal indicative of knocking during a period in which the count in said first counter is smaller than a predetermined limit number;

a plurality of constant circuits in which different predetermined numbers are set respectively; and a plurality of comparators for comparing the content of said second counter with the contents of said constant circuits respectively, said corrective advance computing circuit advancing ignition of said internal combustion engine when the count in said second counter is smaller than a first predetermined number in one of said constant circuits and the content of said first counter is at least equal a predetermined count value, maintaining ignition of said internal combustion engine when the count in said second counter is between said first predetermined number and a second predetermined number in another constant circuit larger than said first predetermined number, and the content of said first counter is at least equal said predetermined count value, and delaying ignition of said internal combustion engine when the count in said second counter is larger than said second predetermined number regardless of the content of said first counter;

said first and second counters being reset to restart counting at the earlier-occurring of two conditions, said conditions being the content of said first counter equalling said predetermined count value, and the content of said second counter exceeding said second predetermined number.

3. A corrective advance computing apparatus responsive to a first signal indicative of engine knock during respective sampling intervals and a second signal indicative of respective combustion cycles of an engine for controlling ignition timing of said engine, comprising:

means responsive to said first signal for obtaining an indication of the amount of engine knock;

means responsive to said second signal for obtaining an indication of the end of a predetermined period, said knock amount indicating means being operative within said predetermined period to obtain an indication of the amount of engine knock; and means for comparing said indication of the amount of engine knock with a predetermined range, said comparing means providing an output signal for (1) advancing ignition timing by a predetermined angle when said indication of the amount of engine knock is less than the lowest value of said range at the end of said predetermined period, said indication of the amount of engine knock thereby corresponding to a low knock rate; (2) maintaining ignition timing when said indication of the amount of engine knock is within said range at the end of said predetermined period, said indication of the amount of knock thereby corresponding to an acceptable knock rate; and (3) delaying ignition timing when said indication of the amount of engine knock is greater than the highest value of said range at any time up to and including the end of said predetermined period, said indication of the amount of engine knock thereby corresponding to a high knock rate.

4. An apparatus as in claim 3 further comprising means for resetting said knock amount indicating means and said period indicating means in response to the earlier-occurring of two conditions, said conditions being (1) the indication of the end of said predetermined period, and (2) when said indication of the amount of engine knock is greater than the highest value of said range.

5. An apparatus as in claim 4, said first signal having respective pulses indicative of engine knock during respective sampling intervals, and said second signal having respective pulses indicated of respective combustion cycles of said engine, wherein:

said knock amount indicating means comprises a first counter for counting the pulse of said first signal; and said period indicating means comprises a second counter for counting the pulses of said second signal.

6. An apparatus as in claim 5, wherein said comparator means comprises:

a first constant circuit for supplying a first range-defining value;

a first comparator connected to said first constant circuit and said first counter for indicating when the content of said first counter is less than said first range-defining value;

a second constant circuit for supplying a second range-defining value greater than said first range-defining value;

a second comparator connected to said second constant circuit and said first counter for indicating when the content of said first counter is greater than said second range-defining value; and means responsive to an output of said first comparator and said second comparator for providing an output signal to selectively advance, maintain, and delay ignition timing in accordance therewith.

* * * * *